US006872435B2

(12) United States Patent
Bull et al.

(10) Patent No.: US 6,872,435 B2
(45) Date of Patent: Mar. 29, 2005

(54) MULTI-COMPONENT UNIDIRECTIONAL GRAPHIC ARTICLE

(75) Inventors: Sally J. Bull, North St. Paul, MN (US); David J. Murphy, Vadnais Heights, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 09/759,986

(22) Filed: Jan. 12, 2001

(65) Prior Publication Data

US 2001/0006714 A1 Jul. 5, 2001

Related U.S. Application Data

(63) Continuation of application No. 09/094,896, filed on Jun. 15, 1998, now abandoned.

(51) Int. Cl.[7] .................................................. B32B 3/10
(52) U.S. Cl. ....................... 428/40.1; 52/105; 52/171.3; 428/41.9; 428/42.1; 428/138; 428/187; 428/191; 428/195; 428/204
(58) Field of Search ............................... 428/40.1, 42.1, 428/41.9, 138, 187, 191, 195, 204; 52/105, 171.3

(56) References Cited

U.S. PATENT DOCUMENTS

| 243,962 A | 7/1881 | Palmer |
| 3,691,140 A | 9/1972 | Silver ........................ 260/78.5 |
| 3,957,724 A | 5/1976 | Schurb et al. .......... 260/46.5 E |
| 3,997,702 A | 12/1976 | Schurb et al. .............. 428/352 |
| 4,145,216 A | 3/1979 | Merrill et al. |
| 4,313,988 A | 2/1982 | Koshar ......................... 428/40 |
| 4,358,488 A | 11/1982 | Dunklin et al. ............... 428/31 |
| 4,407,932 A | 10/1983 | Loder et al. |
| 4,421,816 A | 12/1983 | Arnold ........................ 428/202 |
| 4,503,114 A | 3/1985 | Cohen ......................... 428/247 |
| 4,521,785 A | 6/1985 | Matsufuji |
| 4,567,073 A | 1/1986 | Larson et al. ................. 428/40 |
| 4,614,667 A | 9/1986 | Larson et al. .............. 427/54.1 |
| 4,673,609 A | 6/1987 | Hill ............................ 428/187 |
| 4,952,783 A | 8/1990 | Aufderheide et al. ....... 219/528 |
| 4,968,063 A | 11/1990 | McConville et al. |

(Continued)

FOREIGN PATENT DOCUMENTS

| GB | 2 230 646 A | 4/1989 |
| GB | 2 244 585 A | 12/1991 |
| WO | WO 94/17766 | 8/1994 |
| WO | WO 95/23034 | 8/1995 |
| WO | WO 96/06745 | 4/1996 |
| WO | WO 96/11798 | 4/1996 |
| WO | WO 97/43128 | 11/1997 |
| WO | WO 00/46022 | 8/2000 |

OTHER PUBLICATIONS

Brochure: Cadillac Plastic and Chemical Company, Clear Focus™ Film (1995).
Brochure: Cadillac Plastic and Chemical Company, Laser–Visions™ Perforated "Retro–Reflective" Marking Film[PAT.] (Published as of Jun. 14, 1998).

*Primary Examiner*—Nasser Ahmad
(74) *Attorney, Agent, or Firm*—Colene H. Blank

(57) ABSTRACT

The present invention relates to graphic or informational articles that may be applied to a surface of a translucent or substantially clear substrate so that the image may be viewed through the substrate. The graphic articles of the present invention include a perforated imageable component and a non-perforated attachment component. The imageable component includes an opaque, perforated imageable film layer that accepts an image layer on its first major surface. On the second major surface of the imageable film layer, a perforated, opaque light absorbing film is applied.

29 Claims, 4 Drawing Sheets

U.S. PATENT DOCUMENTS

| | | |
|---|---|---|
| 5,177,890 A | 1/1993 | Hisatomi et al. |
| 5,202,190 A | 4/1993 | Kantner ................... 428/447 |
| 5,290,615 A | 3/1994 | Tushaus et al. ............. 428/40 |
| 5,421,926 A | 6/1995 | Yukinobu et al. ........... 156/83 |
| 5,468,532 A | 11/1995 | Ho et al. .................... 428/40 |
| 5,525,177 A | 6/1996 | Ross ......................... 156/240 |
| 5,550,346 A | 8/1996 | Andriash et al. ...... 219/121.72 |
| 5,582,434 A | 12/1996 | Skov et al. ................. 283/81 |
| 5,588,679 A | 12/1996 | Skov et al. ................. 283/67 |
| 5,609,938 A | 3/1997 | Shields ..................... 428/138 |
| 5,679,435 A | 10/1997 | Andriash ................... 428/137 |
| 5,681,660 A | 10/1997 | Bull et al. ................. 428/500 |
| 5,773,110 A | 6/1998 | Shields ..................... 428/40.1 |
| 5,776,575 A | 7/1998 | Hiraoka et al. ............ 428/64.1 |
| 5,830,529 A | 11/1998 | Russ ......................... 427/152 |
| 5,902,435 A * | 5/1999 | Meis et al. ................. 156/230 |
| 6,004,649 A | 12/1999 | Nagata |
| 6,162,868 A * | 12/2000 | Radigon ...................... 525/88 |

* cited by examiner

MULTI-COMPONENT UNIDIRECTIONAL GRAPHIC ARTICLE

This is a continuation of application Ser. No. 09/094,896, filed on Jun. 15, 1998, now abandoned, titled MULTICOMPONENT UNIDIRECTIONAL GRAPHIC ARTICLE, which is incorporated herein by reference.

BACKGROUND OF THE INVENTION

1. Field of the Invention

The present invention relates to graphic or informational articles that may be applied to a surface of a translucent or substantially clear substrate so that the image may be viewed through the substrate. More particularly, the graphic articles of the present invention include a perforated imageable component and a non-perforated attachment component. Each component is made up of layers of polymeric films. The components may be laminated to form a unitary graphic or informational article.

The imageable component includes an opaque, perforated imageable film layer which may accept an image layer on its first major surface. On the second major surface of the imageable film layer, a perforated, opaque light absorbing film is applied. The attachment component includes a substantially transparent scrim layer of a polymeric film. The scrim layer is un-perforated and includes a pressure sensitive adhesive on its first major surface a heat activated adhesive on its second major surface. After the imageable film layer is imaged to form an image layer on its first major surface, the heat activated adhesive may be used to laminate the attachment component to the first major surface of the imageable component to create a finished graphic article. The pressure sensitive adhesive on the attachment component may then be used to attach the graphic article to the transparent substrate.

When the graphic articles of the present invention are mounted on a transparent substrate, an observer on one side of the substrate may view an image or a message through the substrate, and an observer on the opposite side of the substrate enjoys a substantially unobstructed view through the image and the substrate.

2. Description of Related Art

Advertisers and merchants desire the ability to display graphic and/or informational images on a wide variety of surfaces. In recent years, transparent surfaces such as, windows, walls, and the like, have attracted a great deal of attention as substrates for advertising media. If a graphic image is applied to a transparent substrate, it is desirable that the image be visible when viewed from one side of the window while leaving the window and image substantially transparent when viewed from the other side of the window. Thus, for example, if the image is to be mounted on a window of a vehicle, such as a bus or taxicab, it is desired that passengers be able to see clearly through the window, while pedestrians outside of the vehicle see the graphic image.

Graphic articles achieving the effect typically are multilayer film constructions with an opaque (light colored, usually white) film adapted to receive an image on one surface and a light absorbing (dark, usually black) film or ink applied to the opposite surface. A pressure sensitive adhesive and removable backing, or carrier, material is applied to the dark film or ink which allows the printed graphic to be handled and applied to a window.

Numerous perforations through the film layers create an optical illusion of "transparency" through the graphic article. The perforations are sized and spaced such that, when observed from the imaged side, a viewer has a tendency to focus on the image. However, when observed from the relatively darker side, the viewer has a tendency to see through the graphic article, leaving the window unobstructed. In addition, it is well known that windows appear dark or opaque when viewed from an area of relatively bright ambient light into a relatively darker area. When viewed from an area of relatively dark ambient light into a relatively brighter area, the windows appear transparent. The unidirectional effect of the graphic article is enhanced by this effect, which allows viewers in relatively darker areas, such as the interiors of vehicles and buildings, to see through the unidirectional graphic article, while viewers in relatively brighter ambient light will see the printed graphic.

Unidirectional graphic articles of the type described above are typically imaged by parties other than the film manufacturer. Since the film cannot be imaged through the adhesive and backing material, the image and backing material must be applied to the light side of the film. The graphic articles are then mounted on a window so that the imaged surface may be viewed directly and the dark surface may be viewed through the glass (referred to as a "first surface" application). As a result, when the window is a barrier between the indoors and the outdoors, the unidirectional film must be applied to the exterior of the window with the imaged surface exposed to the outside environment. Unfortunately, in some applications, exposure of the imaged surface of the graphic article to the environment is not ideal since the image must be durable, resistant to ultraviolet and other ambient light, and weatherable. Additionally, dirt and other contaminants may become entrapped within the perforations of the film and adhere to the pressure sensitive adhesive against the window, reducing the service life of the graphic article. Although application of a clear, un-perforated protective layer over the imaged surface may improve service life under certain conditions, such layers are expensive and require additional process steps that may be difficult for the end-user to perform.

To avoid the problems created by exposure of the imaged surface of the graphic article to vandalism and the environment, it is desirable that the image be viewable through the transparent substrate (referred to as a "second surface" application). For example, the graphic article may be applied to the interior of a window so that the image may be viewed through the window glass by observers outside a building. However, to occupants of the building, the view outward through the window glass will be relatively unobstructed. This mounting procedure allows the window glass itself to act as a protective barrier for the imaged surface of the graphic article against vandalism and the environment.

FIG. 6C of WO 96/11798 illustrates an example of an interior mount graphic article with an image that may be viewed unidirectionally. This article includes a single transparent panel 12 with a color image layer 22 applied on a first surface. The second surface of the image layer 22 includes an adhesive layer 48 that may be protected by an optional peel-off liner layer 50. A light absorbing (black) paint layer 24 is applied over the image layer 22. The entire construction is perforated with through holes 42. As shown in FIG. 6D of WO '798, the liner layer 50 may be removed and the perforated construction may be attached to an interior surface of a window using the adhesive layer 48.

Unidirectional graphic articles sold by Cadillac Plastic and Chemical Co. under the trade designation Interior Mount Clear Focus Film include a transparent, perforated poly (vinyl chloride) (PVC) reverse imaged on one surface.

The surface of the PVC film opposite the image includes a pressure sensitive adhesive layer that may be used to mount the graphic article on an interior surface of a window. After imaging, the imaged surface of the PVC layer is screen printed (flood coated) first with an opaque layer of white pigment, and next is screen printed (flood coated) with a layer of black pigment. Following the flood coating steps, the graphic article may be applied to an interior surface of a window with the pressure sensitive adhesive.

U.S. Pat. No. 5,679,435 to Andriash illustrates in FIG. 2 a unidirectional interior mount graphic article 14 with a retro-reflective opaque sheet 12. The opaque sheet 12 is imaged on a first surface and includes a dark adhesive layer 15 on a second surface. A double-sided transparent transfer adhesive 13 is placed over the image surface of the sheet 12 after printing. The composite structure is then perforated with a laser. A clear laminate 19 may be adhered to the black adhesive layer 15 to seal the structure and prevent entry of dirt into the perforations. The graphic article 14 may then be mounted on an interior surface of a window with the transfer adhesive 13.

It is well known in the signage industry that advertisers and merchants prefer graphic articles that may be prepared at a local print shop. This ensures that the articles will be easily updateable and printable with a wider variety of custom images at a reasonable cost. While the currently available interior mount unidirectional graphic articles perform well, these articles are difficult for an end user to prepare with commonly available printing equipment. Applying a dark paint layer on the image as in WO '798, or flood coating white and/or black layers over the image, requires specialized printing equipment and inks that are unavailable and/or too expensive for many end users. In addition, unless specialized inks and screen printing equipment are used, in many cases these coating steps do not adequately cover the image layer, which results in a less than satisfactory image. The construction described in the '436 patent avoids these problems, but requires laser perforation following the imaging step. This is not feasible for the typical end user.

SUMMARY OF THE INVENTION

A unidirectional graphic article is needed which may be easily prepared for application to a transparent substrate. This graphic article would not require complex printing or flood coating steps, and would not require that laser perforation steps be performed by the end user. The graphic articles would be simple for an end user to prepare and customize using widely available printing and lamination equipment.

The present invention addresses these needs and provides a unidirectional graphic or informational article that may be applied to a surface of a translucent or substantially clear substrate so that the image may be viewed through the substrate. If the substrate is a window, an image formed on the article may be viewed from the opposite side of the window from which the article is mounted, while leaving a substantially unobstructed view when viewed through the side on which the film is mounted. In the industry, the mounting of film on one side of a window to be viewed from the opposite side of the window is called a "second surface" application.

The graphic articles of the present invention are made up of layers of polymeric films that may be laminated or adhesively attached to one another to form a complete construction. The graphic articles of the present invention include two components: a perforated imageable component and an un-perforated attachment component. The perforated imageable component may be imaged by any conventional printing technique, such as screen printing, lithographic printing, electrostatic printing, thermal transfer, inkjet printing, piezoelectric printing and the like. The attachment component is adhered to the imageable component and is used to attach the graphic article of the present invention to a transparent substrate.

The imageable component includes an opaque, perforated, imageable polymeric film layer and a light absorbing, perforated, non-reflective film layer that are adhered to one another or co-extruded. The opaque imageable film layer has a first major surface that may be imaged by any conventional printing technique to form an image with a least two colors, preferably four or more colors. Applied on the second major surface of the imageable film layer is a perforated, opaque light absorbing film layer.

The attachment component includes an un-perforated substantially transparent scrim layer of a polymeric film with a heat activated adhesive applied on its first major surface and a pressure sensitive adhesive applied on its second major surface.

Unlike conventional unidirectional graphic articles, the separate attachment component of the present invention allows the imaged surface of the film to be affixed to the window, thereby enabling the window to protect the image from dirt, abrasion, weathering and other conditions which would have a tendency to degrade the image.

Following imaging of the imageable film layer to form an image layer on its first major surface, the imageable component is laminated to the attachment component using the heat activated adhesive on the first major surface of the scrim layer to create a finished graphic article. The pressure sensitive adhesive on the second major surface of the scrim layer may then be used to attach the graphic article to the transparent substrate. When so mounted, an observer on one side of the substrate may view an image or a message through the substrate, and an observer on the opposite side of the substrate enjoys a substantially unobstructed view through the image and the substrate.

DETAILED DESCRIPTION OF THE INVENTION

The graphic articles of the present invention are made up of layers of polymeric films which may be laminated or adhesively attached to one another to form a complete construction. The graphic articles of the present invention include two components: a perforated imageable component and an attachment component. The perforated imageable component may be imaged by any conventional printing technique. The attachment component is adhered to the imageable component and is used to attach the graphic article of the present invention to a transparent substrate.

Figure 1:
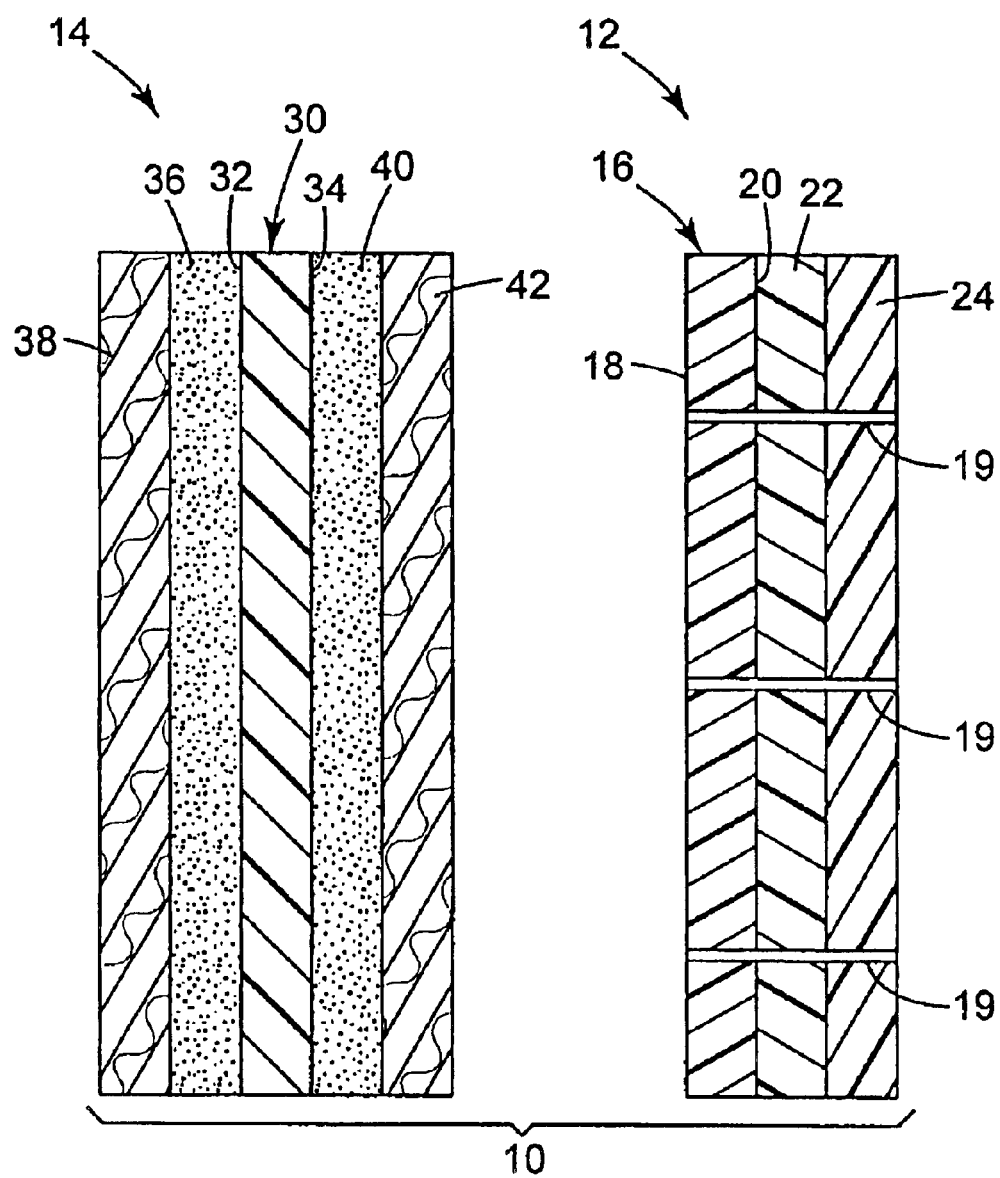
FIG. 1 is a schematic, cross sectional view of the graphic article of the present invention prior to imaging.

FIG. 1 is a schematic, cross sectional view of a graphic article 10 of the present invention prior to imaging and lamination steps. The graphic article 10 includes an imageable component 12 and an attachment component 14. The imageable component 12 is a multilayer film construction that includes an opaque, imageable film layer 16 and an opaque light absorbing layer 22. The term opaque as used herein means impenetrable by visible light, i.e. neither transparent nor translucent. The opaque films may be dark colored or light colored, and may be treated to create surface properties to provide any desired appearance to the image layer. For example, the imageable film layer 16 may include optional patterned layers (not shown in FIG. 1) that may be used to transfer a translucent "holographic" pattern to an image layer formed on the layer 16. The "holographic" pattern may be used to provide a decorative effect, or for product identification or security purposes. The film used to form the imageable film layer 16 may also be retroreflective or luminescent to provide a reflective or glowing surface appearance to the graphic articles of the present invention.

The polymeric films selected for the imageable film layer 16 may vary widely depending on the intended application, but vinyl films and polyolefin films are preferred. Poly(vinyl chloride) (PVC) films are particularly preferred. The films may be covered on their exposed surfaces by optional protective paper liners (not shown in FIG. 1). The thickness of the imageable film layer 16 may vary widely depending on the intended application, but typically the layer 16 has a thickness of about 0.1 to about 2.0 mils (0.0003 cm to 0.005 cm). The imageable film layer 16 has a first major surface 18 and a second major surface 20. The first major surface 18 of the imageable film layer 16 is designed to have printed thereon an image with at least two colors, preferably four or more colors. As is well known in the art, the surface 18 may be modified or may include additional layers to enhance adhesion of a particular ink, dye or toner. The surface 18 typically has a light color, preferably white, to make the image printed thereon appear more distinct to an observer. The surface 18 may be modified to have a shiny finish or a matte finish, depending on the intended application.

Adjacent the second major surface 20 of the imageable film layer 16 is an opaque, light absorbing film layer 22. The term light absorbing as used herein refers to materials that do not reflect visible light. Typically, the light absorbing film layer 22 is darkly colored, preferably black. The polymeric films selected for the light absorbing layer 22 may vary widely depending on the intended application, but vinyl films and polyolefin films are preferred. Poly(vinyl chloride) (PVC) films are particularly preferred. The films may be covered on their exposed surfaces by removable, protective paper liners (not shown in FIG. 1). The thickness of the light absorbing film layer 22 may vary widely depending on the intended application, but typically the layer 22 has a thickness of about 1.0 to about 5.0 mils (0.0025 cm to 0.013 cm). The surfaces of the light absorbing film layer may also be modified to provide any desired finish, and a matte finish is desired for most second surface window applications. The use of the light absorbing film layer 22 allows the end user to tailor the finish of the absorbing layer 22 for an particular application, and such control is not available if conventional screen printed black inks are used. This is particularly important since the absorbing layer 22 is normally exposed to the viewer when the graphic articles of the present invention are used in second surface window applications.

The imageable film layer 16 and the light absorbing film layer 22 may be adhered to one another by any conventional technique, and normally are co-extruded polymeric films.

As shown in FIG. 1, to provide the graphic articles of the present invention with unidirectional properties, the opaque imageable film layer 16 and the light absorbing layer 18 are perforated with apertures 19. The term perforated as used herein refers to materials that have been punched with a plurality of apertures. The diameter of each aperture 19 may vary widely depending on the required density to match the desired viewing distance. If used in second surface window applications, the apertures 19 must be sized and spaced to allow an observer outside the window to view an image printed on the imageable layer, while an observer inside the window to have a substantially unobstructed view through the graphic article. The apertures 19 may be circular, square, triangular or any other shape, and may form a regular or irregular repeating pattern. Preferably, the apertures 19 are circular and have a diameter of about 0.02 to about 0.08 mils (0.0005 mm to 0.002 mm), and a diameter of 0.060 mils (0.0015 mm) is preferred for most second surface window applications. Within these ranges, about 10–70% of the imageable film layer 16 and the light absorbing layer 22 will comprise open space. The apertures 19 may be made in any conventional manner, such as by die cutting, punching, or with a laser.

An optional second perforated imageable film layer 24 may be attached to the light absorbing film layer 22 if printing a second image is desired for a particular application. The second imageable film layer 24 may the same or different than the imageable film layer 16, but the second imageable film layer 24 is normally a white or light colored polymeric film.

An optional substantially transparent protective film layer (not shown in FIG. 1) may also be attached to the light absorbing film layer 22 to prevent entry of dust, dirt and cleaning solvents into the finished graphic article.

The second component of the graphic article of the present invention is the attachment component 14. The attachment component 14 includes a substantially transparent and un-perforated scrim layer 30. The term substantially transparent as used herein means that an image applied on the first major surface 18 of the imageable film layer 16 can be viewed through the scrim layer 30 such that the presence of the scrim layer 30 does not detract from the appearance of the image when the attachment component 14 is laminated to the imageable component 12 to form a completed graphic article. The scrim layer 30 may be any continuous, polymeric film. Polyester films are preferred for most second surface window applications, such as for example, those available under the trade designation Scotchpak from 3M Company, St. Paul, Minn., U.S.A. (3M).

To a first major surface 32 of the scrim layer 30, a pressure sensitive adhesive layer 36 is applied. The pressure sensitive adhesive layer 36 is used to attach the completed graphic article to a substantially transparent substrate, and any known pressure sensitive adhesive may be used, as long is it is substantially clear so that an image on the imageable film layer 16 is not obscured when the attachment component 14 is laminated to the imageable component 12. It is also particularly preferred that the adhesive used to form the pressure sensitive adhesive layer 36 be removable from a selected substrate. As used herein, the term removable means that the pressure sensitive adhesive layer 36 should preferably be selected to permit the graphic article of the present invention to be easily removed from a substrate without leaving substantial adhesive residue on the substrate. Polyurethane based adhesives and acrylic pressure sensitive adhesives have been found to work well to form the adhesive layer 36. The pressure sensitive adhesive layer 36 may be protected by an optional release liner 38. Useful liners include silicone coated paper or polymeric films.

A second major surface 34 of the scrim layer 30 has applied thereon a layer 40 of a substantially transparent heat activated ("hot-melt") adhesive. Any substantially transparent heat activated adhesive layer may be used in the layer 40, and ethylene vinyl alcohol (EVA) and ethylene acrylic acid (EAA) adhesives have been found to work well for second surface window applications. The heat activated adhesive layer 40 may be protected by an optional release liner 42. Useful liners include silicone coated paper or polymeric films.

Figure 2:
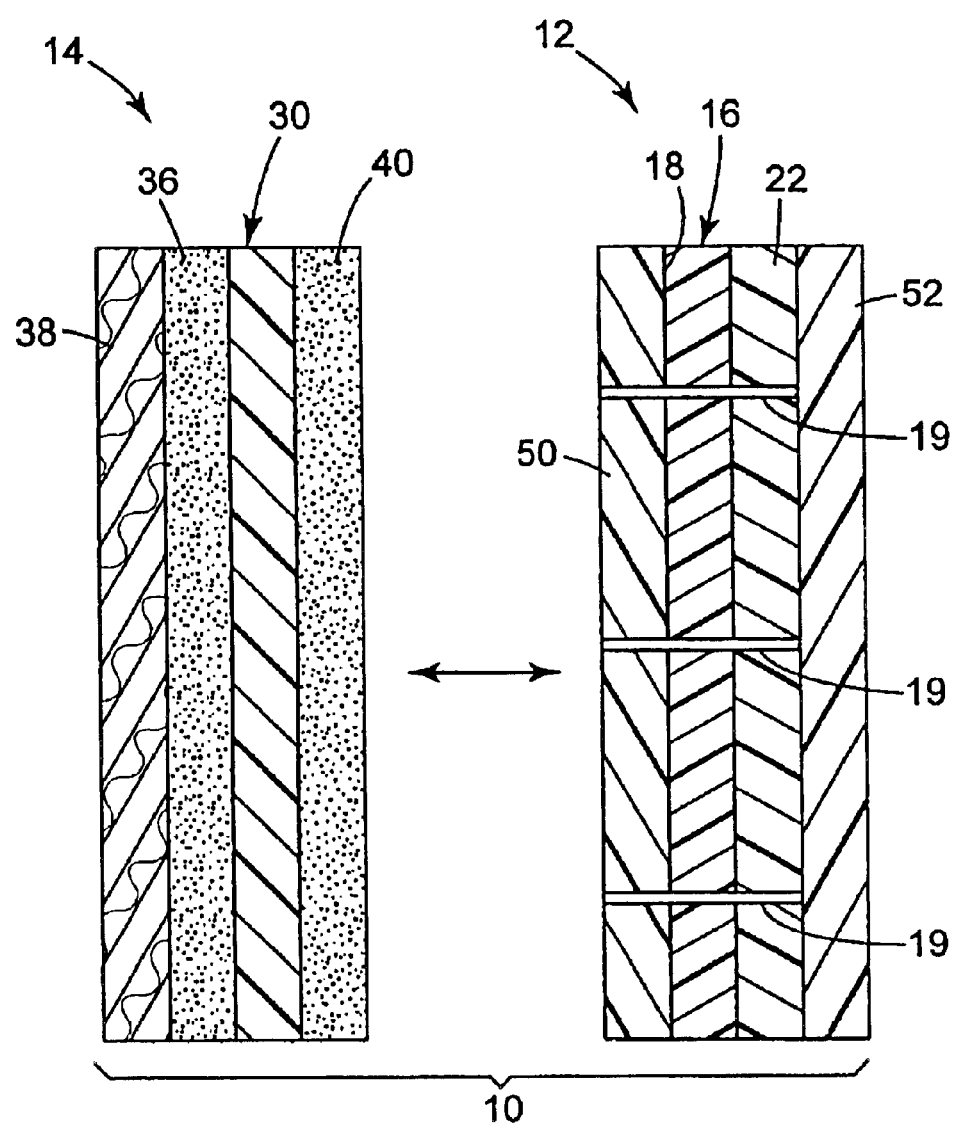
FIG. 2 is a schematic, cross sectional view of the graphic article of the present invention subsequent to imaging and prior to lamination.

To create a graphic article of the present invention, the end user must first image the imageable component 12. As shown in FIG. 2, a discontinuous image layer 50 is formed on the first major surface 18 of the imageable film layer 16. Since the imageable film layer 16 is perforated with a plurality of apertures, the image layer 50 will be not be formed in the apertures, but only in the land areas surrounding the apertures. When the graphic article of the present invention is viewed closely, the apertures will be apparent and the image will appear discontinuous. However, at a normal viewing distance from the graphic article, the human eye will act to resolve the discontinuous image into a continuous image, and the apertures will not be visible.

The image layer 50 can be comprised of one or more color layers, any of which can be applied continuously or discontinuously to form an informational or decorative design. The specific number of color layers used for a particular application can be dictated by the desired visual impact of the graphic article, printing costs, and the like. However, several color layers are particularly preferred to provide an image layer with significant advertising impact. These multi-color image layers are typically digitally created and applied in one pass through a large format printer to provide an image with photograph-like realism. The color layers making up the image layer 24 can be applied by any known printing or painting method for forming an image on a polymeric film, including, for example, screen printing, electrographic (electrostatic and electrophotographic) printing, offset printing, thermal ink jet printing, piezo ink jet printing, or thermal mass transfer. A preferred printing transfer process for vinyl base layers is the electrostatic printing process available from 3M, St. Paul, Minn., U.S.A., under the trade designations "Scotchprint" and "Scotchprint 2000."

As is well known, the color layers useful in the present invention can be provided as an aqueous solution, emulsion or dispersion comprising a binder, a color agent and various optional ingredients. As described in, for example, U.S. Pat. No. 5,468,532 to Ho et al., which is incorporated herein by reference, suitable color layer compositions can be engineered to provide specific benefits to the image layer. For example, the binder or binders selected for use in the color layers can display hot melt adhesive properties and can be blended to improve the tensile strength, heat resistance, and environmental resistance of the color layer, as well as its adhesion to the base layer or image-protective surface layers. The binder used in the color layers can be crosslinked to alter the modulus, the dimensional stability in response to temperature and humidity, melting temperature, tensile strength, adhesion or heat resistance of the image layer. Other optional additives which can be incorporated into the color layer include cosolvents, defoamers, surfactants, antioxidants, light stabilizers, ultraviolet light absorbers, biocides and the like.

The imageable component 12 will typically be digitally imaged by the purchaser, who can print any custom advertising message thereon by any conventional printing method on commonly available printing equipment. For example, electrostatic transfer for digital imaging employs a computer to generate an electronic digital image, an electrostatic printer to convert the electronic digital image to a multicolor toned image on a transfer medium, and a laminator to transfer the toned image to a durable substrate. Electrostatic printing systems include those available from 3M, St. Paul, Minn., U.S.A. under the trade designation "Scotchprint Electronic Graphics System." In this system a personal computer is used to electronically store and manipulate images. Suitable electrostatic printers include single-pass printers and multiple pass printers. Single Pass Printers include the machines available under the trade designations "9510" and "9512" from Nippon Steel Corporation of Tokyo, Japan, and those available under the trade designations "Scotchprint 2000 Electrostatic Printer" from 3M, St. Paul, Minn., U.S.A. Suitable multiple-pass printers include those available under the trade designation "Model 8900 Series" printers from Xerox Corporation of Rochester N.Y., U.S.A. and those available under the trade designation "Model 5400 Series" from Raster Graphics of San Jose, Calif., U.S.A. Suitable piezo ink jet printers include the 5000 series from Raster Graphics, San Jose, Calif., U.S.A., as well as printers available from Gerber, Inc., Burlington, Mass., U.S.A., and Xerox Corporation, Stamford, Conn., U.S.A.

Examples of suitable electrostatic toners include those available under the trade designations "Model 8700 Series" toners from 3M, St. Paul, Minn., U.S.A., and suitable transfer media include those available under the trade designations "Model 8600" media (e.g., 8601, 8603, and 8605) from 3M.

Following the imaging step to form the image layer 50, an optional clear protective layer 52 may be laminated to the light absorbing layer 22 to prevent entry of dirt and cleaning solvents into the perforations in the imageable component.

To form a completed graphic article, the optional release liner 42 (See FIG. 1) is removed from the attachment component 14, and the attachment component is adhered to the imageable component 12. Typically, the heat activated adhesive layer 40 on the attachment component 14 will be placed next to the image layer 50 on the imageable component 12, and the attachment component 14 and the imageable component 12 will be hot laminated to form a completed graphic article. The separate attachment component of the present invention affixes the imaged component to the window, and the window protects the image from dirt, abrasion, weathering, vandalism and other conditions which would have a tendency to degrade the image.

The lamination step may be easily performed by an end user with commonly available lamination equipment. The temperature and pressure required for the lamination step may vary widely depending on the composition of the pigment layers and the number of pigment layers, and should be sufficient to transfer the pigment layers and adhere them to the image layer on the imageable component 10. Typical lamination temperatures are about 250–290° F. (120–145° C.) and typical lamination pressures are about 30–100 psi ($2 \times 10^5$–$7 \times 10^5$ N/m$^2$). Laminators for attachment of the pigment transfer component 30 to the imageable component 10 include, for example, those available under the trade designations "Orca III," "Orca IV" from GBC Protec, DeForest, Wis., U.S.A., and those available from 3M under the trade designation Scotchprint 9542.

Figure 3:
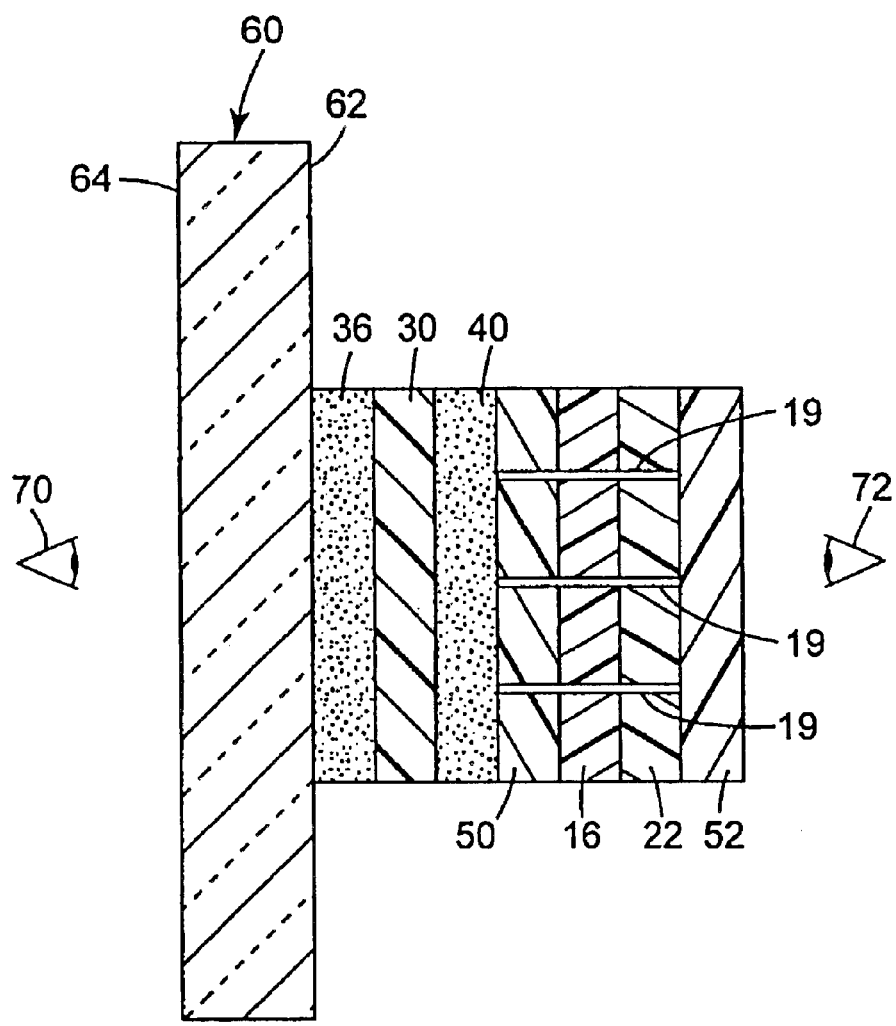
FIG. 3 is a schematic, cross sectional view of the graphic article of the present invention affixed to a window.

Once the attachment component 14 has been laminated to the imageable component 12, the completed graphic article 10 is ready for attachment to a substantially transparent substrate such as a window. To attach the completed graphic article to a window, the release liner 38 that overlies the pressure sensitive adhesive layer 36 is removed. Then, as shown in FIG. 3, the graphic article 10 is adhered directly to an interior surface 62 of a window 60 using the adhesive in the adhesive layer 36. To ensure good adhesion to the window surface, it can be necessary to remove surface dirt, chemical residues and liquids from the surface prior to application of the graphic article to the surface. Typically, following removal of the release liner, the graphic article is smoothly and flatly applied in one continuous motion. The graphic article can be squeegeed flat by a roller to remove entrapped air and to provide a good adhesive bond with the underlying window surface.

After the completed graphic article is attached to the interior surface 62 of the window substrate 60, a first observer 70 that looks directly at the exterior surface 64 of the window 60 will see through the window 60 and observe the image layer 50. A second observer 72 that looks at the clear protective layer 52 overlying the opaque light absorbing layer 22 will see through the apertures in the image and see light through the window. The second observer 72 will not see the image layer 50 under normal lighting conditions.

The graphic article of the present invention will now be described with reference to the following non-limiting examples.

EXAMPLES

Example 1

A. Preparation of Imageable Component

Imageable Component A1

Imageable Component A1 was a layered construction composed of co-extruded polyolefin films. The co-extruded film included a first imageable layer of a white polyolefin film available from Deerfield Plastics Co., Inc. of Deerfield, Mass., U.S.A. The first layer had a thickness of about 2 mils (0.05 mm).

Adjacent the white polyolefin layer was a second light absorbing layer of a black polyolefin film available from Deerfield Plastics Co. The second co-extruded layer of the Imageable Component A1 also had a thickness of about 2 mils (0.05 mm).

The first layer of the finished co-extruded film included a surface modifying layer of a Bynel resin. The surface modification layer is described generally in U.S. Ser. No. 08/687,310, which is incorporated herein by reference.

The co-extruded film construction was then perforated to about 50% of its total surface area with apertures having a mean diameter of about 60 mils (1.52 mm).

Figure 4:
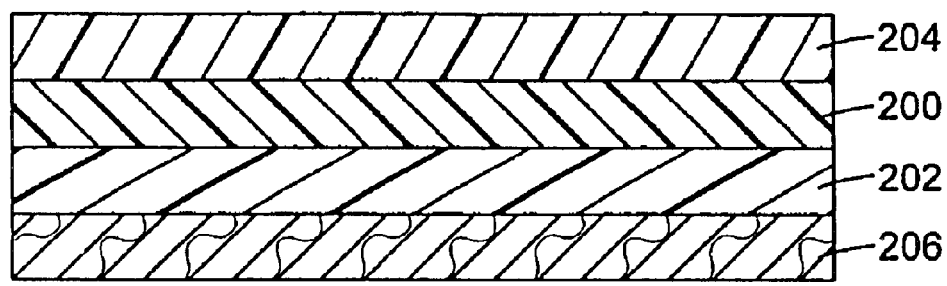
FIG. 4 is a schematic, cross sectional view of the imageable component of the graphic article of the present invention prior to imaging.

A schematic representation of the finished construction is shown in FIG. 4, with white imageable film layer 200, black light absorbing film layer 202, surface modification layer 204, and removable release liner 206.

Imageable Component A2

Imageable Component A2 was a layered construction composed of co-extruded film poly(vinyl chloride) (PVC) films. The co-extruded film included a first layer of a white PVC film available from 3M under the trade designation Scotchcal. The first layer had a thickness of about 2 mils (0.05 mm).

Adjacent the white PVC layer was a second layer of a black PVC film available from 3M under the trade designation Scotchcal. The second layer had a thickness of about 2 mils (0.05 mm). The black PVC layer was covered with a paper liner.

The co-extruded film construction was then perforated about 50% of its total surface with apertures having a mean diameter of about 60 mils (1.52 mm).

The finished order of the film layers in the construction was the same as shown in FIG. 4, but no surface modification layer 204 was included.

Imaging of the Imageable Components A1 and A2

The exposed surfaces of the white layers of the Imageable Components A1 and A2 were then imaged using thermal transfer of a four color electrostatic image layer generated by the Scotchprint system available from 3M Company, St. Paul, Minn., U.S.A. (3M).

Preparation of the Attachment Components

Preparation of the Pressure Sensitive Adhesive Layer 1

A low-tack polymelt blend of 58 parts by weight isooctylacrylate (IOA), 40 parts by weight octododecylacrylate (ODA) and 4 parts by weight acrylic acid (AA) was blended with 40% ethylacetate for hand spread use. The (IOA/ODA/AA)/ethylacetate blend was knife coated with a 2 mil (0.051 mm) gap onto a 1.5 mil (0.038 mm) silicone polyester release liner available from Rexham Graphics of Bedford Park, Ill., U.S.A. under the trade designation CL PET A12/000. The applied layer of polymelt was dried in a 200 deg. F. (93° C.) oven for 2 minutes, then cured through a standard U.V. processor to complete the pressure sensitive adhesive layer.

Preparation of Pressure Sensitive Adhesive Layer 2

The microsphere based adhesive described in U.S. Pat. No. 3,691,140 was knife coated with a 2 mil (0.051 mm) gap onto a 1.5 mil (0.038 mm) silicone polyester release liner available from Rexham Graphics under the trade designation CL PET A12/000.

The applied layer of microsphere adhesive was dried in a 200° F. (93° C.) oven for 2 minutes.

Attachment Component B1

Figure 5:
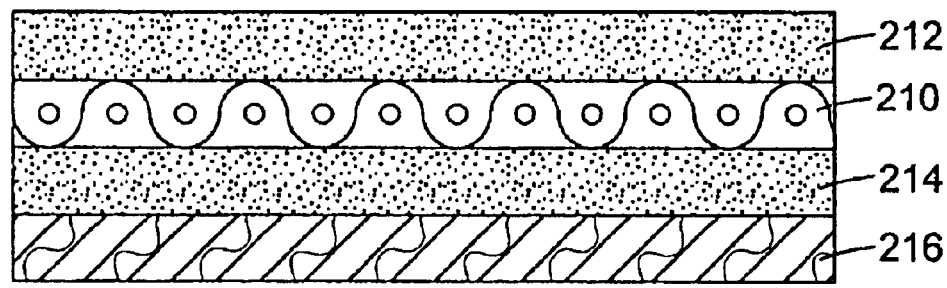
FIG. 5 is a schematic, cross sectional view of the attachment component of the graphic article of the present invention prior to lamination.

An adhesive backed polyester film, available from 3M under the trade designation Scotchpak #125, was cold roll laminated to the Pressure Sensitive Adhesive Layer 1 to form the completed attachment component illustrated schematically in FIG. 5. The completed construction included the polyester scrim layer 210, the EVA hot melt adhesive layer 212, the (IOA/ODA/AA) pressure sensitive adhesive layer 214, and the polyester release liner 216.

Attachment Components B2 and B3

An adhesive backed polyester film with a roughened surface finish, available from 3M under the trade designation Scotchpak #135, was cold roll laminated to the Pressure Sensitive Adhesive Layer 1 to form the completed attachment component B2 with the layered construction illustrated schematically in FIG. 5.

An adhesive backed polyester film with a smooth surface finish, available from 3M under the trade designation Scotchpak #137, was cold roll laminated to the Pressure Sensitive Adhesive Layer 1 to form the completed attachment component B3 with the layered construction illustrated schematically in FIG. 5.

Attachment Component B4

An adhesive backed polyester film available from 3M under the trade designation Scotchpak #29973 was cold roll laminated to the Pressure Sensitive Adhesive Layer 1 to form the completed attachment component with the layered construction illustrated schematically in FIG. 5.

Attachment Component B5

An adhesive backed polyester film available from 3M under the trade designation Scotchpak #33, was cold roll laminated to the Pressure Sensitive Adhesive Layer 1 to form the completed attachment component with the layered construction illustrated schematically in FIG. 5.

Attachment Component B6

An adhesive backed polyester film available from 3M under the trade designation Scotchpak #6, was cold roll laminated to the Pressure Sensitive Adhesive Layer 1 to form the completed attachment component with the layered construction illustrated schematically in FIG. 5.

Attachment Component B7

An adhesive backed polyester film available from 3M under the trade designation Scotchpak #48, was cold roll laminated to the Pressure Sensitive Adhesive Layer 1 to form the completed attachment component with the layered construction illustrated schematically in FIG. 5.

Attachment Component B8

A 2 mil (0.05 mm) layer of an acrylic vinyl solution was knife coated onto Pressure Sensitive Adhesive Layer 1 and dried in the 200° F. (93° C.) oven for 2 minutes. In this example, the acrylic/vinyl solution serves as a scrim-like layer, and no separate scrim layer was used.

Attachment Component B9

A 2 mil (0.05 mm) layer of an acrylic vinyl solution was knife coated onto Pressure Sensitive Adhesive Layer 2 and dried in the 200° F. (93° C.) oven for 2 minutes. In this example, the acrylic/vinyl solution serves as a scrim-like layer, and no separate scrim layer was used.

Lamination of Imageable Component to Attachment Component

The imaged Imageable Components A1 and A2 were then laminated to each of the Attachment Components B1–B9 by hot roll lamination with a laminator available from 3M under the trade designation Scotchprint 9542. The hot roll laminator was set at 100 psi ($7 \times 10^5$ N/m$^2$), the top roll temperature was set at 290° F. (143° C.), and the film components were processed at 2.0 ft/min (0.6 m/min).

Application of Finished Graphic Article to a Substrate

After lamination, the polyester silicone liner was removed to expose the pressure sensitive adhesive layer. The graphic article was then applied to an interior surface of a window by placing the pressure sensitive adhesive layer in contact with the window surface and smoothly rolling the graphic article into place. The paper liner of the final construction was then removed to expose the perforated black film layer. Then, the graphic article was removed from the window and the window was examined for adhesive residue.

Results

The graphic articles made from combinations of Imageable Components A1–A2 and Attachment Components B1–B4 each exhibited excellent results. The image layer was clearly visible through the window substrate and the pressure sensitive adhesive layer, scrim layer, and heat activated adhesive layer. The heat activated adhesive adhered well to the image layers, and the pressure sensitive adhesive adhered well to the window substrate. The pressure sensitive adhesive layers were removable, so the graphic article could be easily removed from the window. Little or no adhesive residue remained on the window following removal of the graphic articles.

The graphic articles made from combinations of Imageable Components A1–A2 and Attachment Components B5–B7 each exhibited less than desirable results. The image layer was clearly visible through the window substrate and the pressure sensitive adhesive layer, scrim layer, and heat activated adhesive layer. However, the adhesion between the heat activated adhesive and the image layer was poor, and the Imageable Components did not bond well with the Attachment Components.

The graphic articles made from combinations of Imageable Components A1–A2 and Attachment Component B8 each exhibited less than desirable results. The image layer was clearly visible through the window substrate, the pressure sensitive adhesive layer, and the heat activated adhesive layer. However, since no scrim layer was present, adhesive slugs remained on the window surface when the graphic article was removed.

The graphic articles made from combinations of Imageable Components A1–A2 and Attachment Component B9 each exhibited less than desirable results. The image layer was not clearly visible through the pressure sensitive adhesive layer since the microspheres distort light as it travels through the graphic article. In addition, since no scrim layer was present, adhesive slugs remained on the window surface when the graphic article was removed.

Various modifications and alterations to this invention will become apparent to those skilled in the art without departing from the scope and spirit of this invention. It should be understood that this invention is not intended to be unduly limited by the illustrative embodiments and examples set forth herein and that such examples and embodiments are presented by way of example only with the scope of the invention intended to be limited only by the claims set forth herein as follows.

We claim:

1. A graphic article, comprising:
   a perforated imageable component comprising:
      an imageable opaque polymeric film layer with an imageable first major surface and a second major surface, and
      an opaque, light absorbing polymeric film layer adhered to the second major surface of the imageable polymeric film layer, wherein the imageable layer and the light absorbing layer are perforated with a plurality of apertures,
   an image layer on the first major surface of the imageable layer,
   an unperforated, attachment component comprising:
   a substantially transparent, continuous polymeric layer with a first major surface and a second major surface, a layer of a substantially transparent hot melt adhesive applied on the second major surface of the continuous polymeric layer and a layer of a substantially transparent pressure sensitive adhesive applied an the first major surface of the continuous polymeric layer, wherein the hot melt adhesive layer on the attachment component is adhered to the image layer an the imageable component.

2. A graphic article as claimed in claim 1, further comprising a perforated light reflecting polymeric film layer applied to the light absorbing polymeric film layer opposite the imageable polymeric film layer.

3. A graphic article as claimed in claim 1, wherein the pressure sensitive adhesive layer is covered by a removable release liner.

4. A graphic article as claimed in claim 3, wherein the pressure sensitive adhesive is an acrylic adhesive.

5. A graphic article as claimed in claim 1, wherein the hot melt adhesive is selected from the group consisting of ethylene vinyl alcohol (EVA) adhesives and ethylene acrylic acid (EAA) adhesives.

6. A graphic article as claimed in claim 1, wherein the continuous polymeric layer is a polyester film.

7. A graphic article as claimed in claim 1, wherein the imageable layer is selected from the group consisting of polyolefin films and vinyl films.

8. A multi-component graphic article comprising:

(a) an imageable component comprising:

an opaque, perforated imageable polymeric film layer with an imageable first major surface and a second major surface, and an opaque, light absorbing, perforated polymeric film layer applied on the second major surface of the imageable film layer; and (b) an attachment component comprising:

a substantially transparent, continuous polymeric layer with a first major surface and a second major surface, wherein a layer of a pressure sensitive adhesive is applied on the first major surface and a layer of a heat activated adhesive is applied on the second major surface;

wherein the hot melt adhesive layer is adhered to the imageable surface of the imageable component.

9. A multi-component graphic article as claimed in claim 8, further comprising a removable release liner on the layer of pressure sensitive adhesive.

10. A multi-component graphic article as claimed in claim 8, wherein the pressure sensitive adhesive is an acrylic adhesive.

11. A multi-component graphic article as claimed in claim 8, wherein the hot melt adhesive is selected from the group consisting of ethylene vinyl alcohol (EVA) adhesives end ethylene acrylic acid (EAA) adhesives.

12. A multi-component graphic article as claimed in claim 8, wherein the continuous polymeric layer is a polyester film.

13. A multi-component graphic article as claimed in claim 8, further comprising a perforated light reflecting film layer applied on the light absorbing film layer opposite the imageable film layer.

14. A multi-component graphic article as claimed in claim 8, wherein the imageable film layer is a white film end the light absorbing film layer is a black film.

15. A multi-component graphic article as claimed in claim 14, wherein the white film and the black film are co-extruded.

16. A graphic article for attachment to a transparent substrate, wherein the graphic article comprises:

a) an attachment component comprising:
  i) a substantially transparent, continuous layer with a first major surface and a second major surface;
  ii) a substantially transparent pressure sensitive adhesive applied on the first major surface; and
  iii) a substantially transparent heat activated adhesive applied on the second major surface; and b) an imageable component comprising:
  i) on imageable film layer with a first major surface and a second major surface, wherein the first major surface is imageable; and
  ii) a light absorbing film layer applied on the second major surface of the imageable layer;

wherein the imageable component is perforated with a plurality of apertures, the first major surface of the imageable component is adhered to the attachment component via the heat activated adhesive, and the graphic article is adhered to the substrate via the pressure sensitive adhesive.

17. The graphic article as claimed in claim 16, wherein the imageable film layer is a white polymeric film.

18. The graphic article as claimed in claim 16, wherein the light absorbing film layer is a black polymeric film.

19. The graphic article as claimed in claim 16, further comprising a light reflecting film layer applied on the light absorbing film layer opposite the imageable layer.

20. The graphic article as claimed in claim 16, wherein the pressure sensitive adhesive is an acrylic adhesive.

21. The graphic article as claimed in claim 16, wherein the hot melt adhesive is selected from the group consisting of ethylene vinyl alcohol (EVA) adhesives arid ethylene acrylic acid (BAA) adhesives.

22. The graphic article as claimed in claim 16, wherein the continuous layer is a polyester film.

23. The graphic article as claimed in claim 16, wherein the imageable film layer is retroreflective.

24. The graphic article as claimed in claim 16, wherein the imageable film layer is luminescent.

25. A window display comprising:

a window with an interior surface and an exterior surface, the window having applied thereto a graphic article comprising:

an imageable component comprising:
  an imageable opaque polymeric film layer with an imageable first major surface and a second major surface, and
  an opaque, light absorbing polymeric film layer adhered to the second major surface of the imageable polymeric film layer, wherein the imageable layer and the light absorbing layer are perforated with a plurality of apertures,
  an image layer on the first major surface of the imageable layer, and
  an unperforated attachment component comprising:
  a substantially transparent, continuous polymeric layer with a first major surface and a second major surface, a layer of a substantially transparent hot melt adhesive applied on the second major surface of the continuous polymeric layer and a layer of a substantially transparent pressure sensitive adhesive applied on the first major surface of the continuous polymeric layer, wherein the hot melt adhesive layer on the attachment component is adhered to the image layer on the imageable component, and the graphic article is adhered to the interior surface of the window with the pressure sensitive adhesive layer.

26. A display as claimed in claim 25, wherein the pressure sensitive adhesive is an acrylic adhesive.

27. A display as claimed in claim 25, wherein the hot melt adhesive is selected from the group consisting of ethylene vinyl alcohol (EVA) adhesives and ethylene acrylic acid (EAA) adhesives.

28. A display as claimed in claim 25, wherein the continuous polymeric layer is a polyester film.

29. A display as claimed in claim 25, wherein the imageable layer is selected from the group consisting of polyolefin films and vinyl films.

* * * * *

UNITED STATES PATENT AND TRADEMARK OFFICE
CERTIFICATE OF CORRECTION

PATENT NO.        : 6,872,435 B2                                          Page 1 of 1
APPLICATION NO. : 09/759986
DATED             : March 29, 2005
INVENTOR(S)      : Sally J. Bull It is certified that error appears in the above-identified patent and that said Letters Patent is hereby corrected as shown below:

Column 12,
Line 37, In Claim 1, delete "lint" and insert -- first --, therefor.
Line 45, In Claim 1, delete "an" and insert -- on --, therefor.
Line 48, In Claim 1, delete "an" and insert -- on --, therefor.

Column 13,
Line 27, In Claim 11, delete "end" and insert -- and --, therefor.
Line 37, In Claim 14, delete "end" and insert -- and --, therefor.
Line 52, In Claim 16, delete "on" and insert -- an --, therefor.

Column 14,
Line 12, In Claim 21, delete "arid" and insert -- and --, therefor.
Line 13, In Claim 21, delete "(BAA)" and insert -- (EAA) --, therefor.
Line 35, In Claim 25, after "unperforated" insert -- , --.

Signed and Sealed this

Twenty-seventh Day of March, 2007

JON W. DUDAS
*Director of the United States Patent and Trademark Office*